United States Patent
Miyata et al.

(10) Patent No.: US 6,375,593 B2
(45) Date of Patent: Apr. 23, 2002

(54) POWER ROLLER BEARING AND A TROIDAL TYPE CONTINUOUSLY VARIABLE TRANSMISSION SYSTEM

(75) Inventors: Shinji Miyata; Hiroyuki Itoh; Takashi Imanishi; Hirotoshi Aramaki, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/181,667

(22) Filed: Oct. 29, 1998

(30) Foreign Application Priority Data

Oct. 31, 1997 (JP) .............................................. 9-300621

(51) Int. Cl.[7] .......................... F16C 33/02; F16C 19/10
(52) U.S. Cl. ......................................... 476/40; 384/492
(58) Field of Search ..................... 476/40, 42; 384/590, 384/609, 612, 615, 492

(56) References Cited

U.S. PATENT DOCUMENTS

| | | | |
|---|---|---|---|
| 5,482,382 A | * 1/1996 | Sato et al. | ............... 384/609 X |
| 5,536,091 A | * 7/1996 | Takata et al. | ............... 384/609 |
| 5,556,348 A | 9/1996 | Kokubu et al. | ............... 476/40 |
| 5,823,911 A | * 10/1998 | Hibi | ........................... 476/40 |

FOREIGN PATENT DOCUMENTS

| | | | |
|---|---|---|---|
| JP | 7-71555 | 3/1995 | ........... F16H/15/38 |
| JP | 7-208568 | 8/1995 | ........... F16H/15/38 |
| JP | 8-14350 | 1/1996 | ........... F16H/15/38 |
| JP | 2620857 | 4/1997 | ........... F16C/32/04 |

OTHER PUBLICATIONS

"Rolling Bearings—Dynamic Load Ratings and Rating Life", ISO 281, 1990 (E), Entire Document.

* cited by examiner

Primary Examiner—Lenard A. Footland
(74) Attorney, Agent, or Firm—Sughrue Mion, PLLC (57) ABSTRACT

In the toroidal type continuously variable transmission system 100 incorporating a power roller bearing 11 therein, race grooves 15 and 16 respectively formed in the inner and outer races 35 and 13 of the power roller bearing 11 are respectively structured in such a manner as to have an arc-shaped cross section, and the radii of curvatures of the arc-shaped cross sections of race grooves 15 and 16 are set in the range of 52% to 59% of diameter of a rolling ball body which can roll on these race grooves, thereby being able not only to restrict an increase in dynamic torque of the power roller bearing but also to improve life of the power roller bearing.

9 Claims, 5 Drawing Sheets

● Lexp./L0.1M
■ DYNAMIC TORQUE LOSS (kgf cm)

POWER ROLLER BEARING AND A TROIDAL TYPE CONTINUOUSLY VARIABLE TRANSMISSION SYSTEM

BACKGROUND OF THE INVENTION

1. Field of the Invention

The present invention relates to an improved power roller bearing for use in a toroidal type continuously variable transmission system which is used, for example, as a transmission system of an automobile.

2. Description of the Related Prior Art

In a conventional toroidal type continuously variable transmission system used as a transmission system of an automobile, the rotation of an input disk is transmitted to an output disk in a continuously variable manner through a plurality of power rollers which are respectively included in their corresponding power roller bearings and swingably interposed between the input and output disks.

Here, the power roller bearing comprises: an inner race including a power roller which has a traction portion to be contacted with the above-mentioned input and output disks and also which, due to its rotational movement, can transmit the rotation of the input disk to the output disk; an outer race disposed opposed to the inner race so as to hold the power roller in a freely rotatable manner; and, a rolling ball body which is interposed between the inner and outer races in such a manner as to be held by and between ring-shaped race grooves respectively formed in the mutually opposing surfaces of the inner and outer races, and also which not only transmits a thrust load, which is applied to the inner race from the power roller, to the outer race, but also can be rolled on the race grooves to thereby reduce resistance produced between the inner and outer races during the relative rotation thereof.

As described above, the structure of the power roller bearing, except for the power roller which is provided in the inner race, is almost similar in appearance to that of a thrust ball bearing used to bear a rotary shaft to which a thrust load is to be applied.

In view of this, persons skilled in the art have studied a method for producing the power roller for use in a toroidal type continuously variable transmission system at low costs by diverting parts, which are designed for an existing thrust ball bearing, to the power roller bearing.

However, although the power roller bearing is quite similar in the appearance of the component parts thereof to the thrust ball bearing, the function of the inner race of the power roller bearing is entirely different from that of an ordinary thrust ball bearing. Because of such functional difference of the inner race, the distribution of loads acting on the inner race itself, contact behaviors between the rolling ball bodies, which are interposed between the inner and outer races, and the inner and outer races, and the like are greatly different from those of the ordinary thrust ball bearing. Therefore, in the above component diverting method, there are still left various points to be improved with these differences taken into consideration.

For example, an inner race used in the ordinary thrust bearing serves as a support member for supporting a shaft, whereas a power roller, which is employed in the power roller bearing and can be rotated integrally with its associated inner race, serves as a power transmission member for transmitting the rotation of the input disk to an output disk, that is, it corresponds to a speed change gear in a multistage transmission system of a gear type. And, since such a power roller is rotated at high speeds while it receives a strong pressure from the input and output disks, it generates a great amount of heat; and, such heat generated by the power roller in turn heats the inner race and rolling ball body.

For this reason, as a lubrication oil to be supplied between the inner and outer races, it is indispensable to use a high-viscosity traction oil which has been developed exclusively for the purpose of power transmission.

Also, the traction portion of the power roller to be contacted with the input and output disks provided mutually opposing positions which are located on the outer peripheral edge of the power roller and are spaced 180° apart from each other; and, the strong pressures given from the input and output disks are concentrated onto these mutually opposing positions (of the traction portion) as a total force of thrust and radial loads. Therefore, in the traction portion of the power roller to be contacted with the input and output disks, there is generated a very high contact surface pressure.

For example, an ordinary bearing is used at a contact surface pressure of 2 to 3 Gpa or less. On the other hand, in the case of a power roller bearing used in a toroidal type continuously variable transmission system for a vehicle, at a normal decelerating time, the contact surface pressure thereof provides 2.5 to 3.5 Gpa and, at the maximum decelerating time, the contact surface pressure thereof can sometime reach even 4 Gpa.

Further, the strong pressures given from the input and output disks are concentrated onto the 180°-spaced-apart mutually opposing positions of the traction portion of the power roller as the radial loads, thereby causing the power roller and the inner race, in which the power roller is provided, to be compressed and deformed in the radial direction thereof. Such compression and deformation in turn causes the inner race to be curved. This makes it almost impossible that the thrust loads applied to the inner race from the power roller can be shared uniformly by a plurality of rolling ball bodies respectively interposed between the inner and outer races. That is, the thrust loads to which the rolling ball bodies are subjected become larger on parts of the rolling ball bodies that are situated at positions apart from the above-mentioned mutually opposing positions of the traction portion of the power roller by 90°. As a result of this, the contact surface pressures of the rolling ball bodies with respect to the race grooves are caused to vary, while part of the rolling ball bodies are caused to roll on the race grooves with a very high contact pressure.

Therefore, the traction portion of the power roller to be contacted with the input and output disks as well as the race grooves of the inner and outer races to be contacted by the rolling ball bodies must be specially adjusted in the material thereof, the hardness of the surfaces thereof, and the surface roughness thereof, in order to prevent the lives thereof from being shortened due to the localized application of the high contact surface pressures.

In view of the above-mentioned background, the present applicants have proposed a technology in which the rolling ball bodies are respectively formed of medium or high carbon steel and the hardness and strength of the surfaces of the rolling ball bodies are adjusted by a carbonitriding treatment or by a quenching and tempering treatment, in order to enhance the durability of the rolling ball bodies against the localized application of the contact surface pressures thereto to thereby be able to improve the life of the bearing (see Japanese Patent Unexamined Publication No. Hei. 7-208568).

Also, the present applicants have further proposed a technology in which input and output disks as well as a power roller and an inner race to be contacted with the input and output disks are carburized and thereafter finished by grinding to thereby adjust the hardness of the surfaces of these components and the effective hardened layer depth thereof to a proper value (in the range of 2 mm to 4 mm) which allows the components to resist the localized application of the contact surface pressures (see Japanese Patent Unexamined Publication No. Hei. 7-71555).

However, the above-mentioned employment of the exclusive traction oil as the lubrication oil to be supplied between the inner and outer races, and the special proper adjustments of the hardness, effective hardened layer depth, and surface roughness of the power roller, inner race and rolling ball bodies through the selection of material and surface treatment, as such, are not sufficient.

In other words, since the original object of the power roller bearing is power transmission, it is important that a dynamic torque loss within the power roller bearing is reduced as much as possible to thereby enhance the transmission efficiency of the torque. However, with employment of only the abovementioned improvements, depending on the dimension setting of the race grooves of the inner and outer races as well as the rolling ball bodies, the dynamic torque loss within the power roller bearing can increase to thereby reduce the torque transmission efficiency.

Also, even if the above-mentioned special proper adjustments of the hardness and effective hardened layer depth of the power roller and inner race have been made, in some cases, there can still arise a problem that the life of the power roller bearing is shortened due to the early breakage of the edges of the race grooves and rolling ball bodies or due to the damage of the contact surfaces of the race grooves and rolling ball bodies.

To solve the above-mentioned problems, the present applicants have experimented and analyzed various design data on the components of the power roller bearing to find the correlation between the design data and the increase or decrease in the dynamic torque loss and bearing life. And, as a result of our elaborate study, it has been found that the radii of curvature of the arc-shaped sections of the race grooves formed on the inner and outer races of the power roller bearing are very closely connected with the increase or decrease in the dynamic torque loss as well as the life of the power roller bearing.

SUMMARY OF THE INVENTION

The present invention aims at eliminating the drawbacks found in the above-mentioned conventional power roller bearing and toroidal type continuously variable transmission system. Accordingly, it is a first object of the invention to provide a power roller bearing for use in a toroidal type continuously variable transmission system which can restrict an increase in a dynamic torque loss and also can restrict the shortening of the life of the roller bearing. It is also a second object of the invention to provide a toroidal type continuously variable transmission system which can minimize a dynamic torque loss and improve a torque transmission efficiency due to employment of the above-mentioned power roller bearing.

In attaining the above objects, according to the invention, there is provided, for use in a toroidal type continuously variable transmission system, a power roller bearing for supporting a power roller in a freely rotatable manner, the power roller being swingably interposed between input and output disks, the present power roller bearing comprising: an inner race with the above-mentioned power roller mounted thereon, the power roller having a traction portion to be contacted with the above-mentioned input and output disks and, due to the rotational movement thereof, capable of transmitting the rotation of the input disk to the output disk; an outer race disposed opposed to the inner race for supporting the power roller in a rotatable manner; and, a rolling ball body interposed between the inner and outer races in such a manner that it is held by and between ring-shaped race grooves respectively formed on the mutually opposing surfaces of the inner and outer races, the rolling ball body being capable of transmitting a thrust load, which is applied to the inner race from the power roller, to the outer race and also, due to the rolling motion thereof on the race grooves, reducing resistance produced between the inner and outer races when the inner and outer races are rotated with respect to each other, wherein each of the race grooves respectively formed on the inner and outer races has a cross section of an arc shape, and the radii of curvature of the arc-shaped cross sections of the race grooves are set in the range of 52% to 59% of the diameter of the rolling ball body.

In the power roller bearing which uses a traction oil as a lubrication oil, the dynamic torque loss and bearing life are closely related to the radii of curvature of the arc-shaped sections of the race grooves respectively formed on the inner and outer races of the power roller bearing. In particular, as the radii of curvature of the arc-shaped sections of the race grooves on the inner and outer races increase, the dynamic torque loss decreases. In more particular, when the radii of curvature of the arc-shaped sections of the race grooves on the inner and outer races are set equal to or larger than 52% of the diameter of the rolling ball body, the variation $\Delta Ts$ of the dynamic torque loss is considerably gentle with respect to the slight variation $\Delta r$ of the radius of curvature, and also it is possible to prevent the early breakage of the edges of the race grooves as well as the rolling ball body that is caused by the contact ellipse of the rolling ball body running up onto the edges of the rage grooves.

Also, in the case of the bearing life, as the radii of curvature of the arc-shaped sections of the race grooves on the inner and outer races increase, the bearing life shows a tendency to lower; and, in particular, if the radius of curvature of the arc-shaped section of the race groove on the inner race exceeds 59% of the diameter of the rolling ball body, then the contact ellipse of the rolling ball body becomes excessively small to thereby cause the contact surface of the rolling ball body to be damaged or worn easily, which makes it difficult to secure the basic rated life of the power roller bearing.

In view of the above, if the radius of curvature of the arc-shaped section of the race groove on the inner race is set in the range of 52% to 59% of the diameter of the rolling ball body, then, in the power roller bearing, an increase in the dynamic torque loss can be restricted and also the lowering of the bearing life can be restricted.

Preferably, the inner race may be formed integrally with the power roller.

With use of such integral structure, when compared with the structure in which the inner race and power roller are respectively formed as separate parts, the number of the component parts of the power roller bearing can be reduced. Also, while the power roller is required to be strong since a large load is applied thereto for torque transmission, the inner race can be utilized as an increased diameter portion thereof for increasing the strength thereof, which makes it easy to secure the strength thereof.

Further, even if the power roller is repeatedly deformed due to compression loads applied thereto from the input and output disks, there is no fear that creeping or fretting wear can be caused between the inner race and power roller.

Also, preferably, the radii of curvature of the arcshaped sections of the race grooves on the inner and outer races may be set in the range of 54% to 59% (that is, equal or more than 54% and equal or less than 59%) of the diameter of the rolling ball body.

If the radius of curvature of the arc-shaped section of the race groove on the inner race becomes equal to or more than 54% of the diameter of the rolling ball body, then the inclination angle of the variation Δ Ts of the dynamic torque loss with respect to the slight variation Δ r of the radius of curvature becomes greatly gentler when compared with a case in which it is set in the range between a value equal or more than 52% and a value less than 54% of the diameter of the rolling ball body.

Therefore, if the radii of curvature of the arc-shaped sections of the race grooves on the inner and outer races are set in the range equal or more than 54% and equal or less than 59% of the diameter of the rolling ball body, then the increase in the dynamic torque loss can be restricted further when compared with the case in which it is set in the range of 52% to 59% of the diameter of the rolling ball body.

Also, in attaining the second object of the invention, according to the invention, there is provided a toroidal type continuously variable transmission system for transmitting the rotation of an input disk to an output disk in a continuous and variable speed manner through a plurality of power rollers, which are respectively included in the above-mentioned power roller bearings and swingably mounted between the input and output disks, wherein the toroidal type continuously variable transmission system uses, as the power roller bearings thereof, the power roller bearing.

According to the above structure, since the power roller bearing used therein can restrict an increase in the dynamic torque loss and also can restrict the lowering of the bearing life, the present toroidal type continuously variable transmission system can reduce the dynamic torque loss in the power transmission from the input disk to the output disk, thereby being able to improve the efficiency of the torque transmission.

DETAILED DESCRIPTION OF THE PREFERRED EMBODIMENTS

Now, description will be given below in detail of the embodiments of a power roller bearing and a toroidal type continuously variable transmission system according to the invention with reference to the accompanying drawings.

Figure 1:
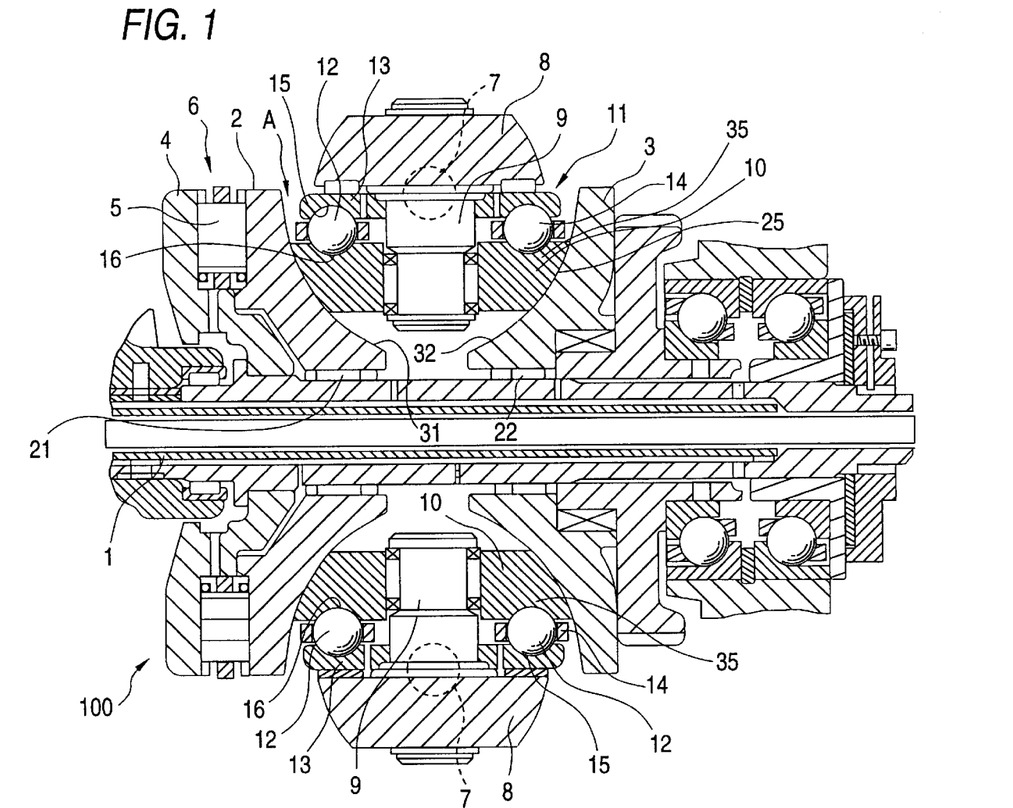
FIG. 1 is a longitudinal section view of the main portions of a first embodiment of a toroidal type continuously variable transmission system incorporating therein a power roller bearing according to the invention.
Figure 2:
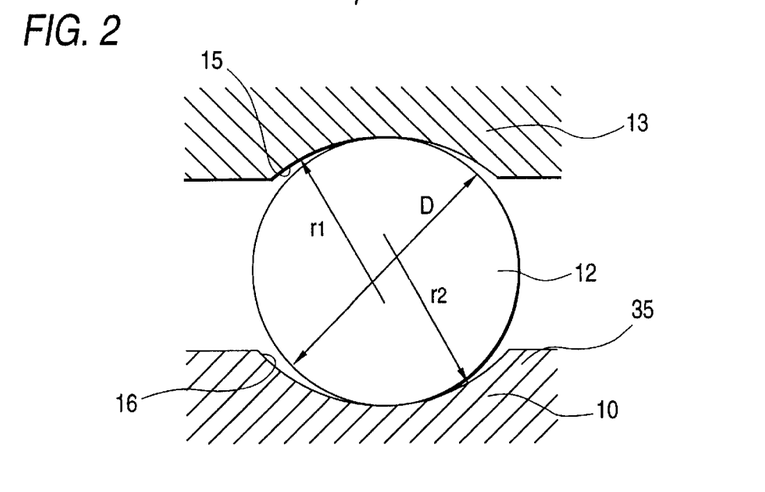
FIG. 2 is an enlarged view of the A portion of the power roller bearing shown in FIG. 1.
Figure 3:
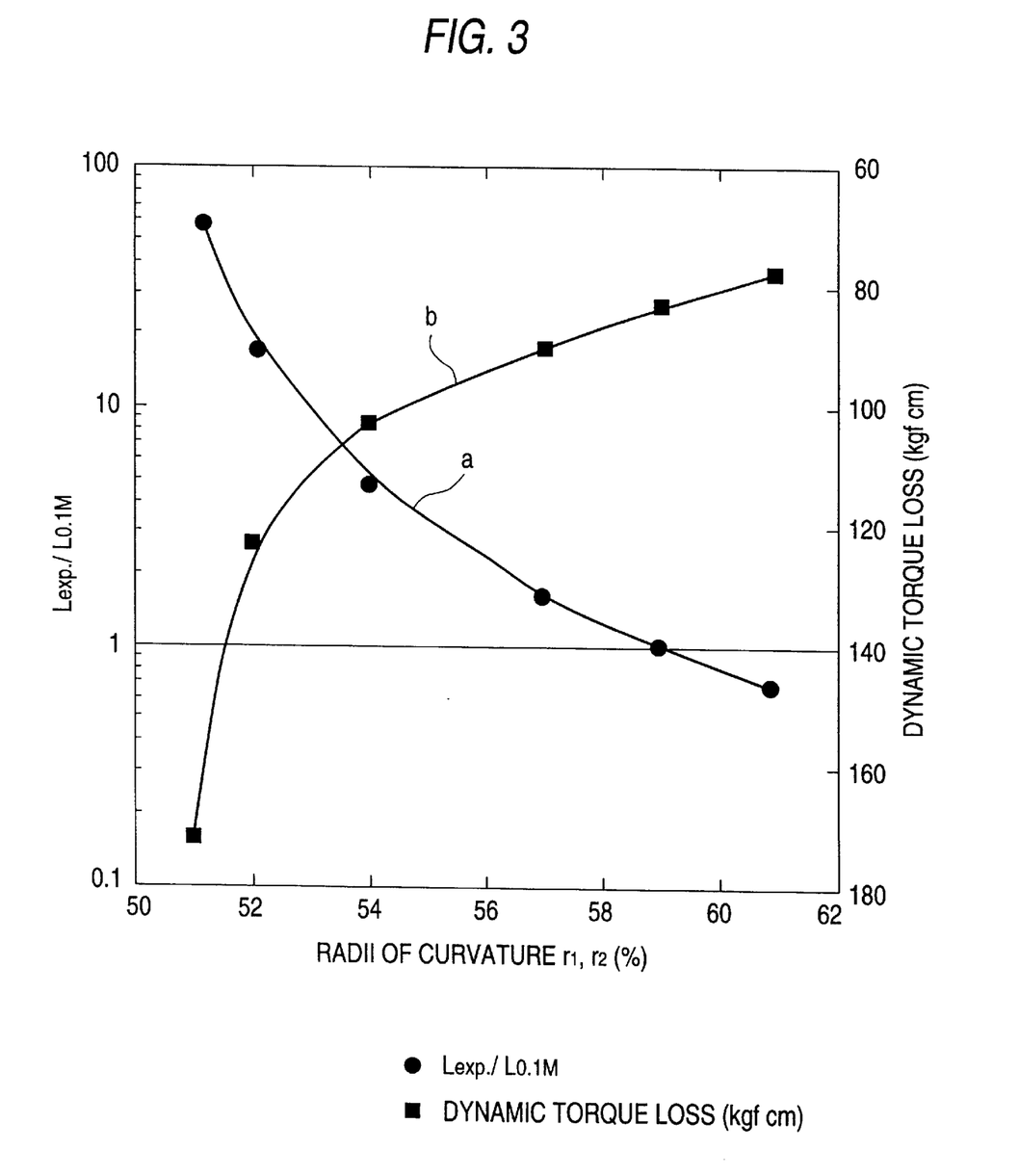
FIG. 3 is a graphical representation of the characteristics of the power roller bearing shown in FIG. 1, in particular, the relation of the bearing life and dynamic torque loss when the radii of curvature of race grooves of the power rollers are caused to vary.
Figure 4:
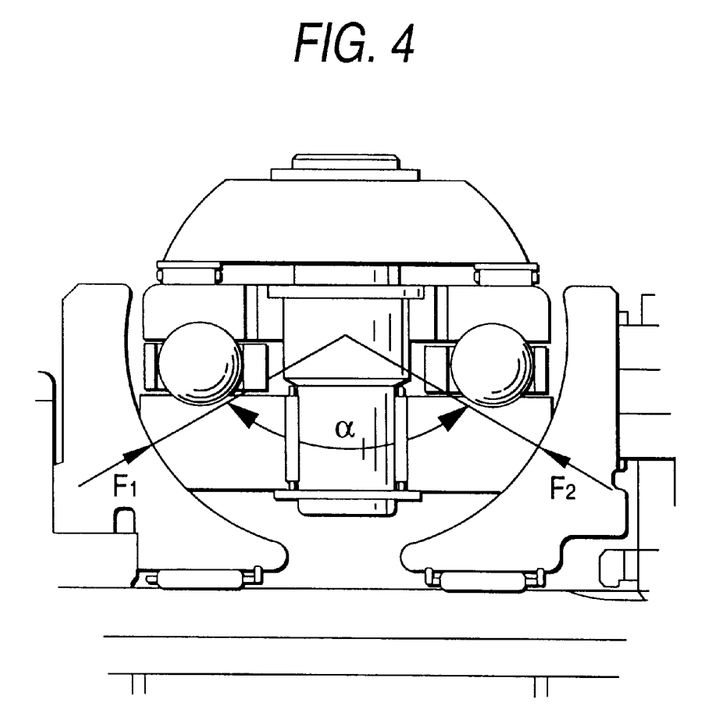
FIG. 4 is an enlarged section view of the power roller bearing, showing the direction of a pressing force to be applied from input and output disks to the traction portion of a power roller.
Figure 5:
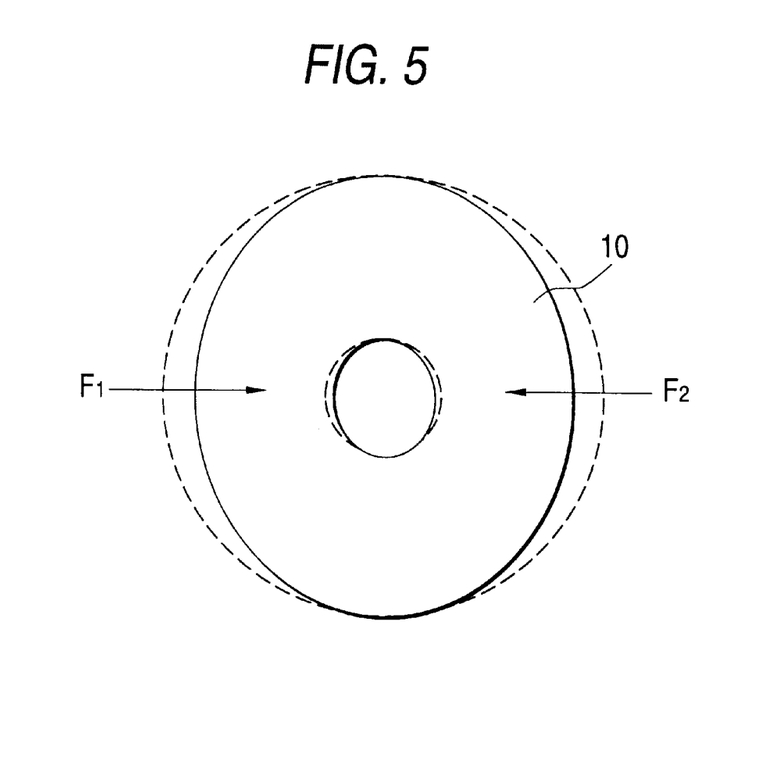
FIG. 5 is a plan view of an inner race formed integrally with the power roller which can be deformed due to a compressing load to be applied from the input and output disks shown in FIG. 1.
Figure 6:
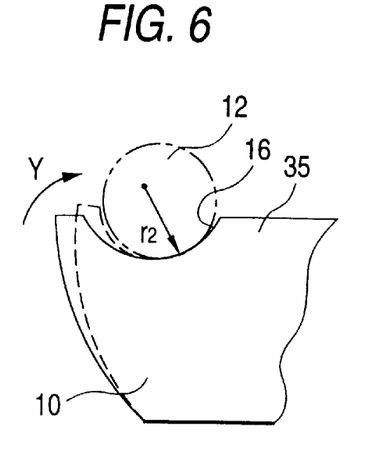
FIG. 6 is a section view of the inner race formed integrally with the power roller, showing the deformation of a race groove formed on the inner race which can be deformed due to a compressing load to be applied from the input and output disks shown in FIG. 1.
Figure 7:
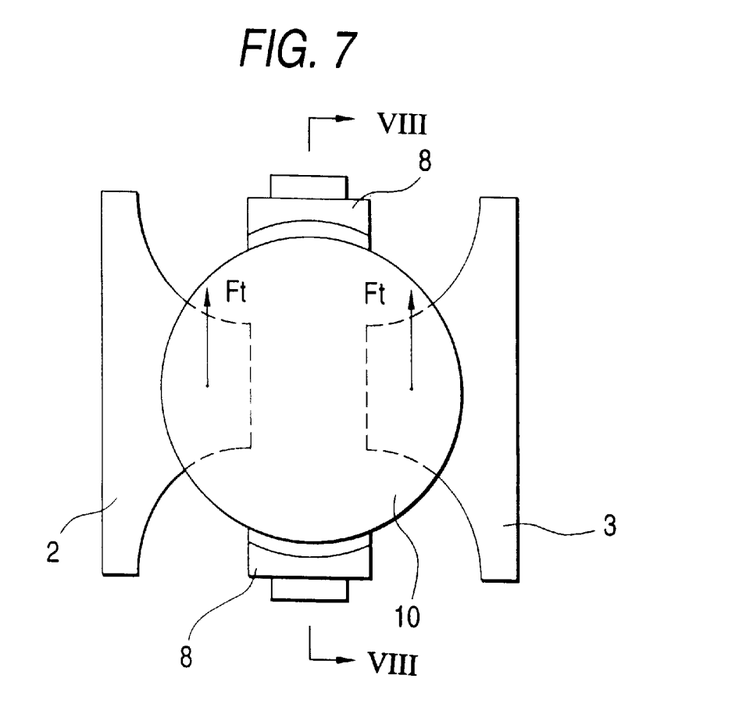
FIG. 7 is an explanatory view of a tangential-direction load to be applied to the traction portion of the power roller from the input and output disks in the power roller bearing shown in FIG. 4.
Figure 8:
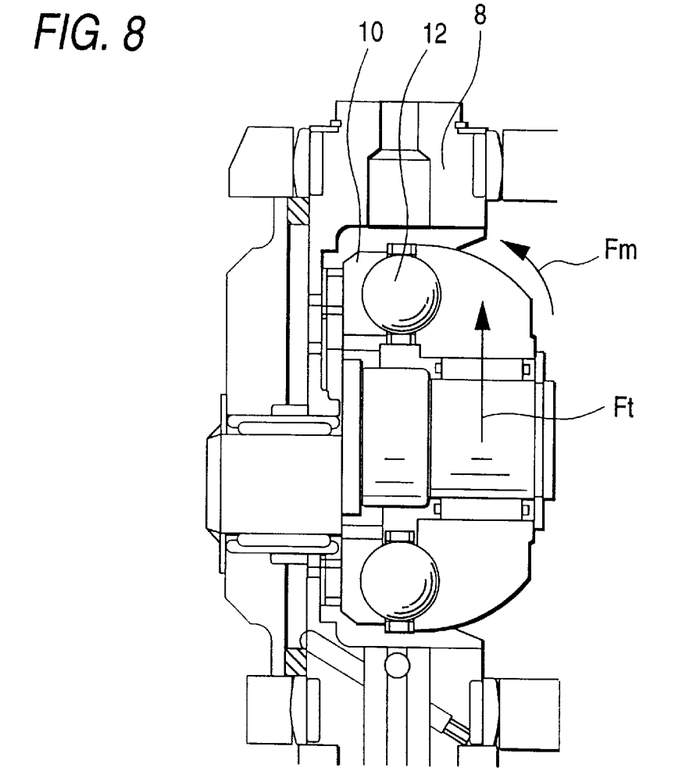
FIG. 8 is a section view taken along the line VIII—VIII shown in FIG. 7.

FIG. 1 is a longitudinal section view of the main portions of a first embodiment of a toroidal type continuously variable transmission system incorporating therein a power roller bearing according to the invention; FIG. 2 is an enlarged view of the A portion of the power roller bearing shown in FIG. 1; FIG. 3 is a graphical representation of the characteristics of the power roller bearing shown in FIG. 1, in particular, the relation of the bearing life and dynamic torque loss when the radii of curvature of race grooves of the power rollers are caused to vary; FIG. 4 is an enlarged section view of the power roller bearing, showing the direction of pressing forces to be applied from input and output disks to the traction portion of a power roller; FIG. 5 is a plan view of an inner race formed integrally with the power roller which can be deformed due to a compressing load to be applied from the input and output disks shown in FIG. 1; FIG. 6 is a section view of the inner race formed integrally with the power roller, showing the deformation of a race groove formed on the inner race which can be deformed due to a compressing load to be applied from the input and output disks shown in FIG. 1; FIG. 7 is an explanatory view of a tangential-direction load to be applied to the traction portion of the power roller from the input and output disks in the power roller bearing shown in FIG. 4; and, FIG. 8 is a section view taken along the line VIII—VIII shown in FIG. 7.

Referring now to the structure of a toroidal type continuously variable transmission system 100 according to the first embodiment of the invention, as shown in FIG. 1, on an input shaft 1 to be connected to a drive source (not shown) such as an engine or the like, there are rotatably disposed an input disk 2 and an output disk 3 in such a manner that they are properly spaced from each other in the axial direction of the input shaft 1, and a power roller bearing 11 according to the invention is assembled or incorporated into between the input and output disks 2 and 3.

In particular, in the present embodiment, the toroidal type continuously variable transmission system 100 employs two power roller bearings 11. The two power roller bearings 11, as shown in FIG. 1, are respectively mounted at positions which are shifted from each other by 180° in the peripheral direction of the input and output disks 2 and 3.

The input and output disks 2 and 3 are fitted with the input shaft 1 respectively through needle bearings 21 and 22 so that they are rotatably supported on the input shaft 1.

On the back surface side of the input disk 2, there is provided a cam plate 4 which is spline-engaged with the input shaft 1 and, between the cam plate 4 and input disk 2, there is interposed a pressing mechanism 6 of a loading cam type which presses the input disk 2 toward the output disk 3 side through a roller 5.

Between the input and output disks 2 and 3, there is disposed a trunnion 8 which can be swung about a pivot 7, while a shift shaft 9 is provided in the center portion of the trunnion 8. And, on the leading end portion of the shift shaft 9 that is situated on the input shaft 1 side, there is rotatably mounted a power roller 10 which includes a traction portion 25 to be contacted with the input and output disks 2 and 3.

The outer peripheral surface of the power roller 10 are contacted with contact surfaces 31 and 32 for torque transmission respectively formed on the input and output disks 2 and 3, so that the traction portion 25 is subjected to a finishing treatment for providing a spherical surface that allows the traction portion 25 to slide on the contact surfaces 31 and 32 of the input and output disks 2 and 3.

The power roller 10 is structured such that, if the trunnion 8 is swung about the pivot 7 and the shift shaft 9 serving as the rotation center shaft is thereby inclined, then the traction portion 25 of the power roller 10 can be slid on the contact surfaces 31 and 32 of the input and output disks 2 and 3 to thereby move the contact positions thereof and thus the power roller 10 is able to rotate swingably. And, in accordance with the rotation radius ratio of the contact position of the traction portion 25 around the input shaft 1 with respect to the input and output disks 2 and 3, the rotation speed to be transmitted from the input disk 2 to the output disk 3 can be made to vary.

Between the trunnion 8 and power roller 10, there is mounted a power roller bearing 11 which is used to support a thrust load to be applied onto the power roller 10 and also which permits the rotation of the power roller 10 around the shift shaft 9.

The power roller bearing 11 comprises an inner race 35 formed integrally with the upper surface portion of the power roller 10, an outer race 13 which is disposed opposed to the inner race 35 so as to support the power roller 10 rotatably and also which is used to receive the thrust load of the power roller 10, and a rolling ball body 12 which is interposed between the inner race and outer race 13 in such a manner as to be held by and between ring-shaped race grooves 15 and 16 respectively formed in the mutually opposing surfaces of the inner and outer races 35 and 13 and also which can transmit the thrust load applied onto the inner race 35 formed integrally with the power roller 10 to the outer race 13 and is able to be rolled on the race grooves 15 and 16 to thereby reduce the resistance produced between the inner race 35 and outer race 13 when they are rotated with respect to each other.

For example, two or more rolling ball bodies 12 are provided on the race grooves 15 and 16 at a certain interval, while the interval between the rolling ball bodies 12 is held by a ring-shaped cage 14 which is mounted between the inner and outer races 35 and 13.

Referring here to the structure of the race grooves 15 and 16 respectively formed on the inner and outer races 35 and 13, as shown in FIG. 2, the cross section shape thereof provides an arc shape. And, the radii of curvature r1 and r2 of the arc shapes of the cross sections of the race grooves 15 and 16 are respectively set in the range of 52% to 59% of the diameter D of the rolling ball body 12 in consideration of an increase in the life of the power roller bearing and a decrease in the dynamic torque loss of the power roller bearing.

Between the inner and outer races of the power roller bearing 11, there is supplied by a lubrication oil supply mechanism (not shown) a high-viscosity traction oil which has been developed exclusively for the purpose of power transmission.

Also, the rolling ball body 12 is made of a steel ball; in particular, with the technology disclosed in Japanese Patent Unexamined Publication No. Hei. 7-208568 applied to the production of the rolling ball body 12, the steel ball is formed of medium carbon steel or high carbon steel and, at the same time, through a carbonitriding treatment as well as through a quenching and tempering treatment, the hardness and strength of the surface of the rolling ball body 12 is adjusted properly.

Further, the technology disclosed in Japanese Patent Unexamined Publication No. Hei. 7-71555 is applied to the manufacture of the input and output disks 2 and 3 as well as the power roller 10 and inner race 35 respectively to be contacted with the input and output disks 2 and 3; in particular, after these component parts are respectively carburized or caronitrided, they are respectively finished by grinding or finished by grinding, whereby the hardness and effective hardened layer depth of the surfaces of these component parts are adjusted to a proper value (in the range of 2 mm to 4 mm) which allows them to withstand the application of the localized contact surface pressures.

Also, since a high stress is applied to the power roller 10, if the crystal grain of the power roller 10 is excessively large, then it undesirably provides a cause for centralization of the stress. For this reason, preferably, the power roller 10 maybe manufactured such that the crystal grain of the power roller 10 provides a grain number 7 or higher according to the JIS-G0552 measuring method.

Now, FIG. 3 shows the relation between the life (the left vertical axis) of the power roller bearing 11 and the dynamic torque loss (the right vertical axis) thereof when the radii of curvature r1 and r2 of the arc-shaped sections of the race grooves 15 and 16 (the horizontal axis) respectively formed on the inner and outer races 13 and 35 of the power roller bearing 11 having an inside diameter of 30 mm are caused to vary.

In the power roller bearing 11 using a traction oil as a lubrication oil, the dynamic torque loss and bearing life are closely related to the radii of curvature r1 and r2 of the arc-shaped sections of the race grooves 15 and 16: in particular, as shown by a characteristic line b in FIG. 3, as the radii of curvature r1 and r2 of the race grooves 15 and 16 increase, the contact ellipses of the rolling ball bodies 12 with respect to the race grooves 15 and 16 become smaller and thus the dynamic torque loss shows a tendency to decrease. Also, as shown by a characteristic line a in FIG. 3, as the radii of curvature r1 and r2 of the race grooves 15 and 16 increase, the bearing life shows a tendency to decrease.

Describing the above in more detail, in order that the rolling ball bodies 12 can roll smoothly, the above-mentioned radii of curvature r1 and r2 are respectively selected in such a manner as to provide a value exceeding at least 50% of the diameter D of the rolling ball body 12 (that is, a value larger than a half of the radius of curvature D of the rolling ball body 12 (namely D/2)): as shown by the characteristic line b in FIG. 3, when the radii of curvature r1 and r2 are less than 52% of the diameter D of the rolling ball body 12, the variation $\Delta$Ts of the dynamic torque loss is sharp with respect to the slight variations $\Delta$ r1 and $\Delta$ r2 of the radii of curvature r1 and r2; and, on the other hand, when the radii of curvature r1 and r2 are equal to or more than 52% of the diameter D of the rolling ball body 12, the variation $\Delta$ Ts of the dynamic torque loss is considerably gentle with respect to the slight variations Δr1 and Δr2 of the radii of curvature r1 and r2.

Also, in the power roller bearing 11, as shown in FIG. 4, two strong pressing forces F1 and F2 respectively given from the input and output disks 2 and 3 are applied onto the two mutually opposing and 180° C. spaced-apart positions of the traction portion 25 of the power roller 10. Since, as shown in FIG. 4, the two pressing forces F1 and F2 respectively have a contact angle α, due to these pressing forces F1 and F2, a thrust load and a radial load are both applied concentratedly onto the two mutually opposing and 180° C. spaced-apart positions of the traction portion 25 of the power roller 10. Also, as shown in FIG. 7, a tangential-direction force Ft is also applied to the traction portion 25. These tangential forces Ft, as shown in FIG. 8, provides a moment force Fm to incline the power roller 10, with the result that a load applied to the power roller bearing is converted to an eccentric load. The occurrence of the eccentric load due to the tangential force is a characteristic of a power roller used in a toroidal type continuously variable transmission system and it is believed that the eccentric load has an influence on the characteristic of the dynamic torque loss shown in FIG. 3 as well.

The radial load, which is concentrated onto the power roller 10 and inner race 35, as shown in FIG. 5, causes the power roller 10 and inner race 35 to be compressed and deformed in the radial directions thereof. And, the compression and deformation of the inner race 35 due to the concentrated application of the radial load, as shown by an arrow Y in FIG. 6, causes the race groove 16 formed in the inner race 35 to be deformed in a direction where the radius of curvature r2 of the section thereof reduces, with the result that the deformation of the race groove 16 increases the contact ellipse between the rolling ball body 12 and inner race 35 to thereby increase the dynamic torque loss.

Further, when the radius of curvature r2 of the race groove 16 of the inner race 35 is less than 52% of the diameter D of the rolling ball body 12, if the radius of curvature r2 of the race groove 16 is reduced due to the compression and deformation of the inner race 35 caused by the concentrated application of the radial load, then there is also a danger that the increased contact ellipse of the rolling ball body 12 can run up onto the edge of the race groove 16 to thereby generate an edge load of a high surface pressure locally, resulting in the early breakage of not only the edge of the race groove 16 but also the rolling ball body 12.

Therefore, to restrict a sharp increase in the dynamic torque loss when the radius of curvature r2 of the race groove 16 is reduced due to the above-mentioned compression and deformation of the inner race 35, and also to prevent the early breakage of the edge of the race groove 16 and rolling ball body 12 caused by the increased contact ellipse running onto the edge of the race groove 16, preferably, the radius of curvature r2 of the race groove 16 of the inner race 35 may be set equal to or more than 52% of the diameter D of the rolling ball body 12.

By the way, as described above, if the radius of curvature r2 of the race groove 16 of the inner race 35 is set equal to or more than 52% of the diameter D of the rolling ball body 12, then it is possible to prevent the early breakage of the edge of the race groove 16 and rolling ball body 12 caused by the increased contact ellipse running onto the edge of the race groove 16.

However, generally, as the contact ellipse of the rolling ball body 12 decreases, the contact surface pressure increases, so that, due to application of the thrust load to the race grooves 15 and 16, striking marks can be easily produced and left on the contact surfaces of the race grooves 15 and 16. Also, the rolling ball body 12 wears more when it rolls on the race grooves 15 and 16.

That is, as shown by the characteristic line a in FIG. 3, contrary to the case of the dynamic torque loss, as the radii of curvature r1 and r2 of the cross sections of the race grooves 15 and 16 formed on the inner and outer races increase, the contact ellipse of the rolling ball body 12 reduces in size. Because of this, the contact surface of the rolling ball body 12 can be easily damaged or worn, resulting in the shortened life of the power roller bearing.

In a power roller bearing for use in a toroidal type continuously variable transmission system to be carried on board a vehicle, normally, a reference running distance (for example, one hundred thousand km) is assumed for the vehicle and thus a basic rated life must be set for the power roller bearing in order to prevent the same from being broken before the running distance of the vehicle reaches the assumed reference distance.

The value of the life shown in FIG. 3 is a value obtained when the number of revolutions of the power roller bearing up to the experimentally measured basic rated life of the bearing is divided by the number of revolutions of the power roller bearing necessary forthevehicletorunorcomple-theassumed reference distance, that is, one hundred thousand km. For example, if the value is 1 or less, then it means that the running of one hundred thousand km cannot be guaranteed.

As shown by the characteristic line a in FIG. 3, if the radius of curvature r2 of the arc-shaped section of the race groove 16 of the inner race 35 exceeds 59% of the diameter D of the rolling ball body 12, then the contact ellipse of the rolling ball body 12 becomes excessively small and, for this reason, the contact surface of the rolling ball body 12 can be easily damaged or worn, which makes it difficult to secure the above-mentioned basic rated life of the power roller bearing.

That is, in order to be able to secure the basic rated life of the power roller bearing that can cope with the reference running distance of the vehicle, preferably, the radius of curvature r2 of the arc-shaped section of the race groove 16 may be set in the range of 59% or lower of the diameter D of the rolling ball body 12.

In other words, in the power roller bearing 11 according to the present embodiment, the radius of curvature r2 of the arc-shaped section of the race groove 16 of the inner race 35 is set in the range of 52% or higher of the diameter D of the rolling ball body 12 to thereby be able to restrict an increase in the dynamic torque loss and, at the same time, the radius of curvature r2 is set in the range of 59% or lower of the diameter D of the rolling ball body 12 to thereby be able to realize the basic rated life of the power roller bearing that can cope with the reference running distance of the vehicle. That is, according to the present power roller bearing 11, the increase in the dynamic torque loss can be restricted and also the lowering of the power roller bearing life can be prevented.

And, the toroidal type continuously variable transmission system 100 using the above-structured power roller bearing 11 is able to reduce the dynamic torque loss in the power transmission from the input disk 2 to the output disk 3 to thereby improve a torque transmission efficiency between the input and output disks 2 and 3.

Further, according to the present embodiment, since the inner race 35 is formed integrally with the power roller 10, when compared with a structure in which they are produced separately as separate members, the number of component parts of the power roller bearing 11 can be reduced. Also, while the power roller 10 is actually required to have a proper strength since a large load is applied thereto for torque transmission, the inner race 35 can be utilized as an increased diameter portion thereof for increasing the strength of the power roller 10, which makes it easy to secure the strength thereof.

Still further, the power roller 10 is deformed repeatedly according to the compression loads that are applied thereto from the input and output disks 2 and 3. That is, in a case where the inner race 35 is formed separately from the power roller 10, if the connecting strength between the inner race 35 and power roller 10 is weak, then a slight gap can occur and disappear between the inner race 35 and power roller 10 each time the power roller 10 repeats its deformation due to the compression loads, which raises a fear that creeping or fretting wear can be caused to occur between the inner race 35 and power roller 10. On the other hand, when the inner race 35 and power roller 10 are formed as an integral structure, there is no possibility that such problems can arise.

As shown by the characteristic line b in FIG. 3, if the radius of curvature r2 of the race groove 16 of the inner race 35 becomes equal to or more than 54% of the diameter D of the rolling ball body 12, then the variation $\Delta$ Ts of the dynamic torque loss with respect to the slight variation $\Delta$ r of the radius of curvature r2 shows a further gentler inclination than when the radius of curvature r2 is set in the range equal or more than 52% and less than 54% of the diameter D of the rolling ball body 12.

Therefore, if the radius of curvature r2 of the race groove 16 is set to a value within the range of 54% to 59% (that is, equal or more than 54% and equal or less than 59%) of the diameter D of the rolling ball body 12, when compared with a case in which the radius of curvature r2 of the race groove 16 is set in the range of 52% to 59% of the diameter D of the rolling ball body 12, the effect in restricting the increase in the dynamic torque loss can be enhanced further, so that it can be expected that the torque transmission efficiency of the toroidal type continuously variable transmission system can be improved further.

Figure 9:
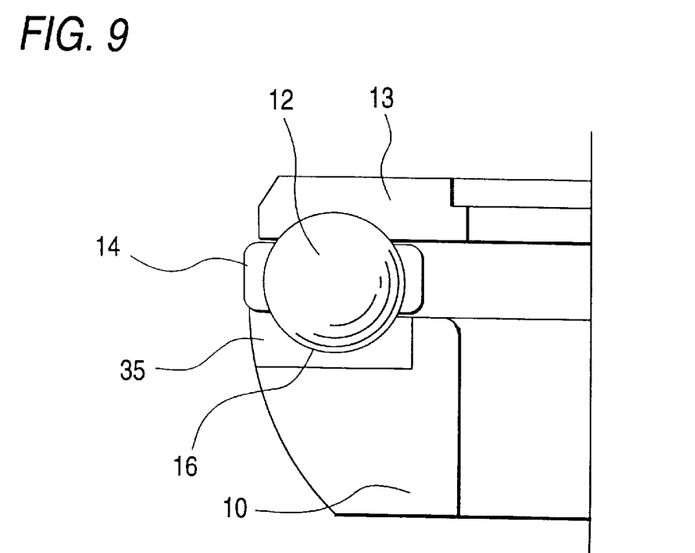
FIG. 9 is a section view of the main portions of a second embodiment of a power roller bearing according to the invention.

By the way, in the above-mentioned first embodiment, the inner race 35 forming part of the power roller bearing 11 is formed integrally with the upper surface portion of the power roller 10. However, this is not limitative but, for example, as shown in FIG. 9, an inner race 35 including race grooves 15 and 16 may be produced separately from the power roller 10.

When the inner race 35 is produced as a separate part in this manner, not only the materials of the power roller 10 and inner race 35 can be selected individually according to their respectively required mechanical strengths or the like, but also the inner race 35, which is easy to wear due to the rolling motion of the rolling ball body 12, can be surface treated or thermally treated in a different manner from the power roller 10 to thereby be able to enhance the wear resistance thereof; that is, use of the separate structure can enhance the freedom of selection of the materials used as well as the freedom of design of these parts with respect to the surface treatment, thermal treatment or the like. Also, since the inner race 35 can be produced as a ring-shaped independent part which is compact in size, light in weight and simple in structure, the machining operation of the race grooves 15, 16 as well as the surface treatment of the inner race 35 can be facilitated, which results in the reduced cost thereof.

Also, in the above-mentioned embodiment, description has been given hereinabove of the toroidal type continuously variable transmission system of a single cavity type. However, even when the present invention is applied to a toroidal type continuously variable transmission system of a double cavity type, there can also be provided similar effects.

Further, in the above-mentioned embodiment, the toroidal type continuously variable transmission system is structured such that it includes the two power roller bearings respectively mounted between the input and output disks. However, this is not limitative but the invention can also be applied to a toroidal type continuously variable transmission system structured such that it includes three power roller bearings between the input and output disks.

As can be seen clearly from the foregoing description, according to the invention, there can be obtained several great effects as follows:

That is, in the power roller bearing according to an embodiment of the present invention the radius of curvature of the arc-shaped section of the race groove formed on the inner race is set equal to or higher than 52% of the diameter of the rolling ball body, based on the discovery of the characteristics of a power roller bearing that the radii of curvature of the arc-shaped sections of the race grooves on the inner and outer races increase, the dynamic torque loss decreases, and also that, when the radii of curvature of the arc-shaped sections of the race grooves on the inner and outer races are set equal to or larger than the diameter of the rolling ball body, the variation $\Delta$Ts of the dynamic torque loss is considerably gentle with respect to the slight variation $\Delta$r of the radius of curvature, and also it is possible to prevent the early breakage of the edges of the race grooves as well as the rolling ball body that is caused by the contact ellipse of the rolling ball body running up onto the edges of the race grooves. Further, in the case of the power roller bearing of this embodiment the radius of curvature of the arc-shaped section of the race groove formed on the inner race is set equal to or lower than 59% of the diameter of the rolling ball body, based on the discovery of the characteristics of a power roller bearing that, as the radii of curvature of the arc-shaped sections of the race grooves on the inner and outer races increase, the bearing life shows a tendency to lower, and, in particular, if the radius of curvature of the arc-shaped section of the race groove on the inner race exceeds 59% of the diameter of the rolling ball body, then the contact ellipse of the rolling ball body becomes excessively small to thereby cause the contact surface of the rolling ball body to be damaged or worn easily, which makes it difficult to secure the basic rated life of the power roller bearing.

Therefore, in the present power roller bearing, an increase in the dynamic torque loss can be restricted and also the lowering of the power roller bearing life can be restricted.

In a structure according to a power roller bearing of the invention in which the inner race is formed integrally with the power roller, when compared with a structure in which the inner race and power roller are formed as separate component parts, the number of the component parts of the power roller bearing can be reduced.

Also, while the power roller is actually required to have a proper strength since a large load is applied thereto for torque transmission, the inner race can be utilized as an increased diameter portion of the power roller for increasing the strength thereof, which makes it easy to secure the proper strength thereof.

Further, since the power roller is deformed repeatedly according to the compression loads that are applied thereto from the input and output disks, in a case where the inner race is formed separately from the power roller, if the connecting strength between the inner race and power roller is weak, then a slight gap can occur and disappear between the inner race and power roller each time the power roller repeats its deformation due to the compression loads, which raises a fear that creeping or fretting wear can be caused to occur between the inner race and power roller. On the other hand, when the inner race and power roller are formed as an integral structure, there is no possibility that such problems can arise.

Now, according to a power roller bearing of the invention, on the basis of the fact that, if the radius of curvature of the arc-shaped section of the race groove on the inner race becomes equal or more than 54% of the diameter of the rolling ball body, then the inclination angle of the variation Δ Ts of the dynamic torque loss with respect to the slight variation Δ r of the radius of curvature becomes greatly gentler when compared with a case in which it is set in the range equal to or more than 52% and less than 54% of the diameter of the rolling ball body, the radii of curvature of the arc-shaped sections of the race grooves on the inner and outer races are limited to the range equal or more than 54% and equal or less than 59% of the diameter of the rolling ball body. That is, according to the present structure, when compared with the case in which the radii of curvature of the arc-shaped sections of the race grooves on the inner and outer races are set in the range of 52% to 59% (that is, equal to or more than 52% and equal or less than 59% of the diameter of the rolling ball body, the increase in the dynamic torque loss can be restricted further to thereby be able to improve still further the torque transmission efficiency of the toroidal type continuously variable transmission system.

Now, in a toroidal type continuously variable transmission system according to the invention, as the power roller bearing to be interposed between the input and output disks in such a manner as to be rotatable swingably, there is used the power roller bearing as described above. This can reduce the dynamic torque loss in the power transmission from the input disk to the output disk to thereby be able to improve the torque transmission efficiency of the toroidal type continuously variable transmission system.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A power roller bearing for use in a toroidal type continuously variable transmission system in which a power roller supported by a power roller bearing is interposed between an input disk and an output disk in a rotatable and inclinable manner, said power roller bearing comprising:

an inner race with said power roller mounted thereon, said power roller having a traction portion to be contacted with said input and output disks in such a manner the rotation of said input disk is transmitted to said output disk through a rotational movement of said power roller;

an outer race disposed opposite to said inner race for supporting said power roller rotatably; and, a rolling element interposed between said inner and outer races in such a manner that it is held between ring-shaped race grooves respectively formed on the mutually opposing surfaces of said inner and outer races, wherein each of said race grooves respectively formed on said inner and outer races has an arc-shaped cross section, and the radii of curvatures of the arc-shaped cross sections of said race grooves are set in the range of 52% to 59% of the diameter of said rolling element.

2. A power roller bearing as set forth in claim 1, wherein said inner race is formed integrally with said power roller.

3. A power roller bearing as set forth in claim 2, wherein said radii of curvatures of the arc-shaped cross sections of said race grooves are set in a range of 54% to 59% of the diameter of said rolling ball body.

4. A power roller bearing as set forth in claim 1, wherein said radii of curvatures of the arc-shaped cross sections of said race grooves are set in a range of 54% to 59% of the diameter of said rolling ball body.

5. A toroidal type continuously variable transmission system as set forth in claim 1, wherein a crystal grain of said power roller is a grain number seven or higher according to a JIS-G0552 measuring method.

6. A toroidal type continuously variable transmission system in which a power roller supported by a power roller bearing is interposed between an input disk and an output disk in a rotatable and inclinable manner, said transmission system including said power roller bearing which comprises:

an inner race with said power roller mounted thereon, said power roller having a traction portion to be contacted with said input and output disks in such a manner the rotation of said input disk is transmitted to said output disk through a rotational movement of said power roller;

an outer race disposed opposite to said inner race for supporting said power roller rotatably; and, a rolling element interposed between said inner and outer races in such a manner that it is held between ring-shaped race grooves respectively formed on the mutually opposing surfaces of said inner and outer races, wherein each of said race grooves respectively formed on said inner and outer races has a arc-shaped cross section, and the radii of curvatures of the arc-shaped cross sections of said race grooves are set in the range of 52% to 59% of the diameter of said rolling element.

7. A troidal type continuously variable transmission system as set forth in claim 6, wherein said inner race is formed integrally with said power roller.

8. A troidal type continuously variable transmission system as set forth in claim 7, wherein said radii of curvatures of the arc-shaped cross sections of said race grooves are set in a range of 54% to 59% of the diameter of said rolling ball body.

9. A troidal type continuously variable transmission system as set forth in claim 6, wherein said radii of curvatures of the arc-shaped cross sections of said race grooves are set in a range of 54% to 59% of the diameter of said rolling ball body.

* * * * *